(12) United States Patent
Luce

(10) Patent No.: US 9,365,689 B2
(45) Date of Patent: Jun. 14, 2016

(54) IMPACT-RESISTANT ARTICLES AND METHODS FOR MAKING THE SAME

(75) Inventor: Norris R. Luce, Huntsville, AL (US)

(73) Assignee: MACRO Industries, Inc., Huntsville, AL (US)

( * ) Notice: Subject to any disclaimer, the term of this patent is extended or adjusted under 35 U.S.C. 154(b) by 22 days.

(21) Appl. No.: 13/319,495

(22) PCT Filed: May 8, 2009

(86) PCT No.: PCT/US2009/043345
§ 371 (c)(1),
(2), (4) Date: Jan. 3, 2012

(87) PCT Pub. No.: WO2010/128972
PCT Pub. Date: Nov. 11, 2010

(65) Prior Publication Data
US 2012/0149267 A1    Jun. 14, 2012

(51) Int. Cl.
| | | |
|---|---|---|
| *C08J 5/24* | (2006.01) | |
| *C08J 5/06* | (2006.01) | |
| *B32B 5/02* | (2006.01) | |
| *B32B 5/22* | (2006.01) | |
| *B32B 5/26* | (2006.01) | |

(52) U.S. Cl.
CPC . *C08J 5/24* (2013.01); *B32B 5/022* (2013.01); *B32B 5/024* (2013.01); *B32B 5/22* (2013.01); *B32B 5/26* (2013.01); *C08J 5/06* (2013.01); *B32B 2260/021* (2013.01); *B32B 2260/046* (2013.01); *B32B 2262/0269* (2013.01); *B32B 2307/3065* (2013.01); *B32B 2307/50* (2013.01); *B32B 2307/54* (2013.01); *B32B 2307/554* (2013.01); *B32B 2307/558* (2013.01); *B32B 2307/56* (2013.01); *B32B 2307/71* (2013.01); *B32B 2307/714* (2013.01); *B32B 2307/718* (2013.01); *B32B 2419/00* (2013.01); *B32B 2457/08* (2013.01); *B32B 2571/00* (2013.01); *B32B 2605/00* (2013.01); *B32B 2605/18* (2013.01); *B32B 2607/00* (2013.01); *C08J 2375/00* (2013.01); *Y10T 442/2615* (2015.04)

(58) Field of Classification Search
CPC .................................................... C08J 5/24
USPC ......................................................... 264/319
See application file for complete search history.

(56) References Cited

U.S. PATENT DOCUMENTS

2007/0224401 A1*  9/2007  Telander ................ 428/212
2009/0054552 A1*  2/2009  Yano et al. ............. 523/200

* cited by examiner

*Primary Examiner* — Larry Thrower
(74) *Attorney, Agent, or Firm* — Ann I. Dennen

(57) ABSTRACT

A method of manufacturing an impact-resistant material is described. Embodiments of the method includes hydrating a reinforcing material, which can be, for example, a fabric comprised of para-aramid fiber, infusing the hydrated reinforcing material with a resin, and curing the infused reinforcing material. Certain embodiments include hydrating the reinforcing material by exposing the reinforcing material to humidity and infusing the material by with a prepolymer-based diisocynate, for example, methylene diphenyl 4, 4'diisocyanate.

14 Claims, No Drawings

IMPACT-RESISTANT ARTICLES AND METHODS FOR MAKING THE SAME

BACKGROUND AND RELATED ART

The present disclosure relates to low weight, durable structural composite having a improved cost-to-weight ratio over other primary structural materials. The structural composite exhibits desirable properties relating to manufacturing of the base material, the production of products that utilize the structural composite, a base cost of materials, and material life cycle costs.

Currently, the majority of structural components are fabricated from one or more of aluminum, such as aviation grade aluminum, titanium, and thermo-set laminated composites. It has been learned over time that a lighter structure can be built using composites, as opposed to the use of metals. However, at least one problem with composites, other than their cost-to-weight ratio, is their failure mechanisms.

Most all composites have low damage tolerances which may result in catastrophic failure. For example, carbon-carbon composite products have a great strength-to-weight ratio. However, due to impacts sustained under a primary structural load, referred to herein as damage tolerance, the strength-to-weight ratio is mitigated to the point that the cost benefit comparison renders the use of such materials less attractive.

Most, if not all composites, are highly susceptible to environmental contamination during manufacturing of the base material as well as during its life cycle. For example, in the aviation environment, materials are subjected to many extremes in exposure to temperature, fluids, chemicals, shock and vibration. To solve many of the shock and vibration problems encountered in metals under such extremes various alloys of metals have been derived to counteract the effects of such an environment.

Summarizing, disadvantages and limitations of the existing solutions for fabrication of structural components include prohibitive cost-to-weight ratios, resistance to environmental contamination in the total life cycle of the material, and diminishing strength-to-weight ratio in response to primary loads.

SUMMARY

According to a number of embodiments, a method of manufacturing impact-resistant material is provided. The method includes hydrating a reinforcing material, infusing the hydrated reinforcing material with a polymer matrix, and curing the infused reinforcing material.

Other features and advantages of the present invention will become apparent to those skilled in the art from a consideration of the following detailed description.

DETAILED DESCRIPTION

The embodiments described below relate to a low weight structural composite material that withstands aviation structural materials requirements while still providing a reduced weight and an increased durability. The described composite can absorb energy and damage while still performing structurally in the aviation environment. The structural composite is an impact-resistant material formed of a hygroscopically pre-adhered polymer matrix-infused reinforcing material.

In one embodiment, the disclosed structural composite is a combination of para-aramid fabric infused with a high solids diisocyanate prepolymer based on methylene diphenyl 4, 4' diisocyanate (MDI) as a resin. MDI is also referred to as diphenylmethane diisocyanate. The diisocyanate prepolymer based on MDI is typically used in the production of various polyurethane foams and surface coatings. MDI and its different modified forms are reactive chemicals which may be supplied as a liquid or solid. In combination with polyols, for example, polyesters and polyethers, they can be used for the manufacture of cellular (foamed) and non-cellular (compact) polyurethane polymers including coatings, elastomers, adhesives, textiles, and paints. MDI is commercially available from Bayer under the trademark MONDUR®.

Para-aramid fabric is by nature hygroscopic. During the initial process of catalytic initiation the prepolymer-based diisocynate, cross-linking occurs with the para-aramid. For adhesion and bonding to the para-aramid, any compound which reacts/activates with water molecule would have application. The selection of the prepolymer MDI compound was based upon its mechanical properties after cure and its similarity to the para-aramid. Because of this cross-linking to the para-aramid, it is possible to apply greater pressures to the wet lay-up prior to complete cross-linking. The resulting yield has increased cross-linking due to the release of moisture induced by heat and pressure. When other resins are used, the high pressures simply squeeze out the resins.

For the structural product of the present disclosure to be fabricated properly, the aramid must have a certain minimum threshold amount of moisture that has been absorbed by the natural hygroscopic nature of the aramid. Those skilled in the relevant arts with the benefit of this disclosure will recognize that this requirement is inapposite to any other structural composite, the processing of which seek to eliminate moisture to the greatest extent possible because moisture degrades the ability of resins to bond with the aramid fibers. For this reason the processing of such conventional prior art impact-resistant composites, even those that employ para-aramid fibers such as Kevlar®, for example, the process extracts all moisture from the fibers in order to promote adequate resin bonding. As a consequence, any moisture allowed in the fabrication of such prior art composites degrades or ruins the composite. However, and with respect to the embodiments disclosed herein, if the minimal moisture is not present, the product will not cure and the properties desired in the finished product will not occur.

The minimal moisture level within the aramid is easily obtained using, for example, a vacuum to remove any excess moisture as aramids naturally adsorb moisture up to its saturation point in the relative humidity environment to which it has been exposed. The required amount of moisture in the fabric is relative to what is required to fully catalyze the MDI. For example, moisture content in the fabric in excess of about two percent of the fabric weight can cause the composite to delaminate due to thermal cycling. Depending upon how the composite panel is used, excess moisture can lead to product failure, while insufficient moisture will not complete catalytic reaction of the MDI. Testing has shown that dry aramid or fabrics without hygroscopic absorption of moisture do not exhibit the properties mentioned above. In one exemplary embodiment, the retained moisture content of the para-aramid fabric is about 2 percent to about 3 percent by weight, and in another embodiment, the retained moisture content is less than about 2 percent by weight.

The combination of the para-aramid in the proper moisture state and the infused high solids prepolymer-based diisocynate yield a wet lay-up composite that is suitable for the formation of flat or contoured composite parts using simple vacuum techniques known in the art. Such techniques are compatible with a low cost, high rate production of high end composite parts using an elevated temperature and high pressures. The resultant product is suitable for molding in a high rate production setting, for example, as a panel molding compound for complex parts such as cowlings, hoods, fenders, helmets and safety equipment. It is believed that the resultant product could be a highly competitive product when compared to fiberglass, S-2 glass, and carbon fiber in major commercial and military products. In addition to the benefits listed above, the resultant composite product will not rot, will not burn and is unlikely to wear out from conventional system usage.

The above described embodiments result from method of manufacturing impact-resistant material that includes hydrating a reinforcing material, infusing the hydrated reinforcing material, such as para-aramid, with a matrix of prepolymer-based diisocynate or another resin compound which catalyzes with moisture, and subsequently curing the infused reinforcing material. In at least one embodiment, the hydrating step includes exposing the reinforcing material to humidity. The hydrating step can be accomplished utilizing various methods including regulating the hydration of the hydrated reinforcing material, for example, by vacuum bagging the hydrated reinforcing material. Another hydrating process includes enclosing the hydrated reinforcing material in a vacuum bag, evacuating the vacuum bag to a predetermined vacuum level, and maintaining the predetermined vacuum level in the vacuum bag. In one specific embodiment, the vacuum bag is evacuated to at least 25 bar.

In another embodiment, the infusing step includes infusing the hydrated reinforcing material with prepolymer-based diisocynate. In a specific embodiment, the infused reinforcing material is formed into a desired configuration prior to curing and the curing step includes applying pressure to the infused reinforcing material. In such an embodiment, pressure may be applied to the infused reinforcing material such that hydrogen is released.

In an alternative embodiment, the application of pressure includes increasing pressure to the infused reinforcing material to a first pressure, for example between about 15 psi up to about 100,000 psi, maintaining the first pressure for a period of time, and increasing the pressure to a second pressure. The increases in pressures over time vary relative to product type and process since the catalytic reaction produces carbon dioxide. Therefore, at least one of a burping process and a hold/step process is used to allow the carbon dioxide gasses to escape. The second pressure applied to the infused reinforcing material in a specific embodiment is at least about 200 tons per square foot.

These embodiments may further include maintaining the pressure at a desired level and applying heat to the infused reinforcing material. A range exists on both temperature and pressure as both pressure and heat speed up the reaction process resulting in a reduced cure time. The higher pressure that is maintained during the curing process, the higher the impact resistance. In one embodiment, the product is held at the high pressure until it is fully cured, thereby increasing the impact resistance of the product. After such steps the cured infused reinforcing material may be cut into a desired configuration.

The embodiments of the structural composite described herein results from additional processing embodiments that include a method of manufacturing an impact-resistant material that includes initiating cross-linking between a matrix of a prepolymer-based diisocynate and a hydrated reinforcing material, and accelerating a catalytic reaction between the prepolymer-based diisocynate and the reinforcing material. The initiating step may include infusing a hydrated reinforcing material with a matrix of prepolymer-based diisocynate and the accelerating step may include subjecting the matrix-infused reinforcing material to energy, for example, heat and/or pressure. The para-aramid fabric may be a woven or a non-woven fabric of para-aramid fibers. The amount of reinforcing material in the impact-resistant material, in an exemplary embodiment, is about 70 weight percent to about 95 weight percent, in another embodiment, about 80 weight percent to about 95 weight percent. The weight percent is based on the total weight of the impact-resistant material. The impact resistant material, in another embodiment, may be formed by laying-up a plurality of layers of the infused reinforcing materials and then laminating the layers together under pressure and optionally heat.

Another resultant method is a method of manufacturing impact-resistant material that includes utilizing water as an initiate of a catalytic reaction between a matrix of prepolymer-based diisocynate and a reinforcing material and utilizing pressure as an accelerant of the catalytic reaction. If the para-aramid is completely dry the prepolymer-based diisocynate will not bond to the para-aramid. However, the para-aramid fabric can be wetted in hydrogen. Hydrogen is what is extracted from the water molecule by the prepolymer-based diisocynate.

A further method includes hygroscopically adhering a matrix to a reinforcing material and accelerating a catalytic reaction between the matrix of prepolymer-based diisocynate and the reinforcing material. Such methods are described as saturating a hygroscopic reinforcing material, subjecting the saturated reinforcing material to vacuum, and infusing the saturated reinforcing material with the matrix of prepolymer-based diisocynate.

This type of resin or matrix displaces the water from the para-aramid, while heat and pressure also cause the para-aramid to release moisture. Once a para-aramid is exposed to an environment containing moisture it becomes hydrated. Using a vacuum to remove the excess moisture in the fabric is a relatively simple method.

In one example, vacuum pump, rated at about 40 microns or lower, may be used to extract moisture. By lowering the pressure, the boiling point of water is also lowered causing the water to change into a gas which is extracted by the pump.

Another method of manufacturing impact-resistant material includes selecting a nonconventional resin, selecting a reinforcing material, determining an adhesion promoter based on the chemical properties of resin and the reinforcing material, utilizing the adhesion promoter to initiate cross-linking between the resin and the reinforcing material, and promoting a catalytic reaction between the resin and the reinforcing material.

Conventional composites utilize a coating on the fabric thereby increasing the surface area for adhesion. This coating does not get displaced by the prepolymer-based diisocynate material. However, this step is not necessary in the instant method because the bonding of the prepolymer-based diisocynate material to the reinforcing material is achieved through the catalytic reaction produced by displacing the hydrogen bond found on the aromatic hydrocarbon structure of the para-aramid.

The temperature ranges and pressure ranges are limited by the initialization of catalytic reaction and the material limits of the compounds in the thermal and pressure environments during cure. For example, prior to a curing step, the temperature and pressure of the prepolymer-based diisocynate should not be taken to above the flash point of the material, while prior to the curing step, the para-aramid should not be taken above a temperature and/or pressure level that causes the para-aramid fiber to degrade or otherwise exhibit damage.

Significant testing has been performed on the structural composite described herein including NIJ ballistic threats at various pressures. In every case, a higher cure pressure during processing allowed for the reduction of reinforcement material layers. Therefore, in weight-critical solutions requiring high strength, high impact resistance and high chemical resistance, the embodiment described herein outperform products made of the identical reinforcement using any other resin material. All other resin materials tested in liquid form were rejected by the aramid at pressures above 150 psi.

Testing performed has included MIL-STD-810(f) environmental testing, FAA blast resistance testing, and ballistic testing as a backing and spall material for ballistic solutions. ASTM testing for tensile strength, burn resistance, puncture resistance, wear resistance and ultraviolet resistance have also been performed.

Typically, composites degrade due to extended ultraviolet exposure. As a composite skin material, the structural composite described herein has exhibited increased puncture resistance due to ultraviolet exposure. The composite has been manufactured and tested for ballistic equivalence performance using vacuum curing, both with and without heat, using low compression pressure curing, both with and without heat, and high compression pressures both with and without heat. It also has been surmised that the more energy used in the curing process associated with the structural composite, the stronger and lighter the end product becomes.

Over time, full material characterizations will be performed to generate the engineering constants required so that variants of the structural composite material can be placed into standardized composite material libraries for general public use. Focused material characterizations have been performed for specific applications such as aircraft skins and laminated composite panels for bulkheads and decking.

The described structural composite material can displace aluminum, titanium, printed circuit boards and other laminates utilized in all major industries. For example, the structural composite is also believed to be useful in the production of aircraft skins, tornado proof walls for safe rooms in homes, reinforcement in concrete structures, hulls of ships, automobiles, semi truck trailers, commercial ULD's and personal safety equipment such as helmets and shin guards.

Industries that may utilize the described structural composite include the aerospace, automotive, and marine industries for primary and secondary structural materials. Laminate product companies which make computer board stock and structural composite panels could benefit from incorporating the structural composite into their products. Armor companies providing armor materials for primary structure and applique application are also a natural fit. The reasons behind the envisioned success for the described embodiments in the transportation industry are due to the reduced weight thereby increasing yield, in addition to the durability of the material.

The structural composite material described herein is extremely resistant to all environment factors encountered for primary structural composites, including, but not limited to, ultraviolet, oils, chemicals, heat, cold, punch loads, fatigue, fracture, point loads and high pressure. The structural composite material has less then half the density of aviation grade aluminum with higher stiffness and strength. It is three-and-a-half times lower in density than titanium with a comparable modulus and tensile strength.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manufacturing impact-resistant material, the method comprising:
   hydrating a reinforcing material, the reinforcing material comprising a fabric;
   infusing the reinforcing material, while the reinforcing material is in a hydrated state, with a prepolymer-based diisocyanate; and
   curing the infused reinforcing material.

2. The method of claim 1 wherein the hydrating step comprises exposing the reinforcing material to humidity.

3. The method of claim 1 further comprising regulating the hydration of the hydrated reinforcing material to obtain a retained moisture content of less than about 2 percent by weight of the reinforcing material.

4. The method of claim 1 further comprising regulating the hydration of the hydrated reinforcing material to obtain a retained moisture content of about 2 percent by weight to about 3 percent by weight of the reinforcing material.

5. The method of claim 3 wherein the regulating step comprises vacuum bagging the hydrated reinforcing material.

6. The method of claim 5 wherein the regulating step comprises:
   enclosing the hydrated reinforcing material in a vacuum bag;
   evacuating the vacuum bag to a predetermined vacuum; and
   maintaining the predetermined vacuum in the vacuum bag.

7. The method of claim 6 wherein the evacuating step comprises evacuating the vacuum bag to at least about 25 bar.

8. The method of claim 1 wherein the infusing step comprises infusing the reinforcing material with the prepolymer-based diisocyanate so that the impact-resistant material comprises from about 70 percent to about 95 percent by weight reinforcing material.

9. The method of claim 1 wherein the curing step comprises applying pressure to the infused reinforcing material.

10. The method of claim 9 wherein the applying pressure step further comprises:
    increasing pressure to the infused reinforcing material to a first pressure;
    maintaining the first pressure for a period of time; and
    increasing the pressure to a second pressure.

11. The method of claim 9 wherein the applying pressure step further comprises applying pressure to the infused reinforcing material to at least about 200 tons per square foot.

12. The method of claim 9 further comprising:
    maintaining the pressure at a desired level; and
    applying heat to the infused reinforcing material.

13. The method of claim 1 wherein the fabric comprises para-aramid fibers.

14. The method of Claim 1 wherein the fabric is a woven or a non-woven fabric.

* * * * *